(12) United States Patent
Kotze et al.

(10) Patent No.: US 11,591,114 B2
(45) Date of Patent: Feb. 28, 2023

(54) AIRCRAFT LOADER

(71) Applicants: Johann Paulus Kotze, Brakpan (ZA); Rudolph Carl Uys, Benoni (ZA)

(72) Inventors: Johann Paulus Kotze, Brakpan (ZA); Rudolph Carl Uys, Benoni (ZA)

( * ) Notice: Subject to any disclaimer, the term of this patent is extended or adjusted under 35 U.S.C. 154(b) by 0 days.

(21) Appl. No.: 17/365,437

(22) Filed: Jul. 1, 2021

(65) Prior Publication Data

US 2023/0002080 A1 Jan. 5, 2023

(51) Int. Cl.
*B64F 1/32* (2006.01)
*B60P 1/44* (2006.01)

(52) U.S. Cl.
CPC ............ *B64F 1/326* (2020.01); *B60P 1/4421* (2013.01); *B60P 1/4471* (2013.01)

(58) Field of Classification Search
CPC ...... B60P 1/4421; B60P 1/4471; B64F 1/322; B64F 1/324; B64F 1/326
USPC ........................................................ 414/347
See application file for complete search history.

(56) References Cited

U.S. PATENT DOCUMENTS

| | | | | |
|---|---|---|---|---|
| 3,275,170 A | * | 9/1966 | Macrae ................. | B60P 1/4421 187/253 |
| 3,499,562 A | * | 3/1970 | Phillips .................. | B64F 1/326 414/495 |
| 5,630,694 A | * | 5/1997 | Ihara ....................... | B66F 7/065 414/373 |
| 5,848,870 A | * | 12/1998 | Smith ....................... | B60P 1/02 296/26.05 |

FOREIGN PATENT DOCUMENTS

| | | | | | |
|---|---|---|---|---|---|
| CN | 109398210 A | * | 3/2019 | ............ | B60P 1/4471 |
| CN | 112124617 A | * | 12/2020 | .............. | B64F 1/326 |
| DE | 202017107129 U1 | * | 2/2019 | .............. | B64F 1/326 |
| EP | 0136970 A1 | * | 4/1985 | .............. | B64F 1/326 |
| EP | 1145901 A1 | * | 10/2001 | ................ | B60P 1/02 |
| FR | 2868755 A1 | * | 10/2005 | ................ | B64F 1/32 |
| GB | 2140385 A | * | 11/1984 | ............ | B60P 1/4421 |

\* cited by examiner

*Primary Examiner* — James Keenan
(74) *Attorney, Agent, or Firm* — FisherBroyles, LLP; Jason P. Mueller

(57) ABSTRACT

An aircraft loader comprises a chassis, a cab, a loading floor and a load lifting apparatus. The load lifting apparatus includes a frame, a first horizontal platform and a second horizontal platform. The frame includes a pair of vertical columns. Each column has a front slider and a rear slider configured to be displaced vertically along the columns. The first platform is displaceable through movement of the rear sliders between a loading floor height and an aircraft loading height. The second platform is displaceable through movement of the front sliders and the first platform between an intermediate height and the aircraft loading height. When the first platform is raised from the loading floor height and reaches the intermediate height, the first and second platforms engage to so as to travel in unison, thus defining a loading deck which is displaceable between the intermediate height and the aircraft loading height.

20 Claims, 13 Drawing Sheets

AIRCRAFT LOADER

FIELD OF THE INVENTION

This invention relates to an aircraft loader and to a load lifting apparatus for an aircraft loader.

BACKGROUND TO THE INVENTION

In the aircraft cargo and catering industry, aircraft cargo loaders, also known as aircraft loaders or simply "loaders", are used to load items onto an aircraft and unload items from the aircraft. As used herein, therefore, the terms "aircraft loader" and "loader" are directed to apparatus and systems for performing either or both of these functions. Similarly, as used herein, the term "load lifting apparatus" refers to an apparatus for both lifting and lowering loads.

Mobile loaders are widely used and both single platform and double platform loaders are known. In the aircraft catering industry, a loader is usually in the form a vehicle comprising a cab and two platforms. A first platform is located in an enclosed or partially enclosed container known as a "load box", behind the cab of the vehicle. The box is mounted to a load lifting mechanism, typically being a hydraulically powered scissor lift mechanism secured to the vehicle's chassis, which is configured to raise and lower the box and thus the first platform. A second platform is located outside of and adjacent to the box, either on top of or at the side of the cab.

When in use in the catering industry, wheeled catering trolleys and other items are loaded onto the first platform while the box is in a lowered position and the load lifting mechanism then raises the box to the required height for loading the aircraft (e.g. to an aircraft door's sill height). The box is raised such that the first and second platforms are at the same level or, alternatively, the loader is configured such that the second platform is displaced together with the box (i.e. the two platforms are always at the same height, in use). The second platform then bridges the gap between the first platform and the aircraft's door, thereby acting as a loading bridge and allowing the items to be transported from the box and into the aircraft.

The "box and scissor" design referred to above has some significant drawbacks. In particular, as the entire box needs to be raised, a heavy construction base is required to raise and lower the load safely. This can make the system fairly cumbersome to deploy and expensive to manufacture and operate.

Furthermore, in many applications a separate power supply and lifting mechanism are required in addition to the first platform's scissor mechanism in order to adjust the second platform to the desired height relative to the first platform and/or the aircraft.

The Inventors identified a need for a load lifting apparatus in which the platform/s to be lifted are smaller and/or lighter, allowing the apparatus to be mounted to a lighter or less strong chassis. Furthermore, the Inventors identified a need for a load lifting apparatus which allows loads to be raised and lowered more rapidly and without requiring a separate lifting mechanism and/or power source per platform, particularly when used to load narrow-body aircraft in the catering industry. Embodiments of the present invention aim to address these needs, at least to some extent.

SUMMARY OF THE INVENTION

According to a first aspect of the invention, there is provided an aircraft loader which comprises a chassis, a cab, a loading floor and a load lifting apparatus, wherein the load lifting apparatus comprises:

- a frame which is secured to the chassis, the frame including a pair of vertical columns spaced apart behind the cab, wherein each column has a front section and a rear section, and wherein each front section is provided with a front slider and each rear section is provided with a rear slider, the front and rear sliders being configured to be displaced vertically along the columns;
- a first horizontal platform mounted behind the cab, the first platform being secured to the rear sliders and selectively displaceable through movement of the rear sliders between a loading floor height and an aircraft loading height, the first platform being driven by a cable system coupled to the rear sliders; and
- a second horizontal platform mounted in front of the first platform, either on top of or at a side of the cab, the second platform secured to the front sliders and displaceable through movement of the front sliders and the first platform between an intermediate height and the aircraft loading height, the intermediate height being a height between the loading floor height and the aircraft loading height, wherein one or both of the first and second platform has mating formations configured such that when the first platform is raised from the loading floor height and reaches the intermediate height, the first and second platforms engage to define a loading deck which is displaceable between the intermediate height and the aircraft loading height, the second platform being driven by the first platform when the platforms are engaged, thereby resulting in the first and second platforms moving in unison between the intermediate height and the aircraft loading height, and such that when the first platform is lowered from the intermediate height the first platform disengages from the second platform to permit the first platform to move back to the loading floor height; and
- a front bridge section which is connected to the second platform, at least part of the front bridge section being displaceable relative to the second platform to accommodate an aircraft opening, in use.

The aircraft loader may be a mobile loader in the form of a wheeled vehicle. In some embodiments, the aircraft loader is an aircraft catering truck for a narrow-body aircraft loader.

The aircraft loader may be a full cab or a half cab aircraft loader. In the case of a full cab aircraft loader, the second platform is located on top of the cab and in the case of a half cab aircraft loader, the second platform is located at a side of the cab. The loading floor may be the floor of a loading box/container forming part of the loader. A loading zone may be defined inside of the loading box, with the first platform being located in the loading zone when at the loading floor height.

The first platform may be mounted substantially between the columns, with the columns being located at front corners of the first platform. The second platform may also be mounted substantially between the columns, with the columns being located at rear corners of the second platform.

Each column may include a pair of slide receivers (a front slide receiver and a rear slide receiver). Each slide receiver may have a vertical slot in a front face thereof for receiving one of the sliders therein. Each slide receiver thus defines a vertical track for the relevant slider to run along. The slide receivers in each column may be positioned back-to-back. In some embodiments, the slide receivers may be in the form of slotted square tubes.

Each slider may have a platform supporting portion and a sliding portion. The platform supporting and sliding portions may be perpendicular to each other and the slider may thus generally have or resemble an "L" shape. Preferably the platform supporting portion is located above the sliding portion. The platform supporting portion may be located at a top of the slider and may support one of the platforms, while the sliding portion may be located below the platform supporting portion and received in the vertical slot of a corresponding slide receiver.

The mating formations may include one or more flanges on the second platform. The flanges may extend from the second platform and may project into a transverse plane traversed by the first platform when raised towards the second platform. Accordingly, when the first platform reaches the second platform the flanges engage with a surface of the first platform such that further upward movement of the first platform also moves the second platform.

The cable system may include at least two cables. Each cable may be secured to a bottom region, e.g. to the sliding portion, of a rear slider. The cables may be secured to their respective sliders via spring-loaded safety brake devices attached to each slider inside of the columns.

The cable system may be a cable and pulley system. The cable and pulley system may in turn be driven by a hydraulic piston and cylinder arrangement, e.g. a hydraulic ram mounted underneath the loading floor. The hydraulic piston and cylinder arrangement may be powered from an engine of the loader or may be battery powered, e.g. using an electro-hydraulic pump. A single stroke, single acting piston and cylinder may be utilised, preferably with a piston stroke length of greater than 1 m, more preferably about 1.5 m. The piston and cylinder may be oriented along the length of the loader.

As mentioned above, in embodiments of the invention only the first platform is directly powered. The second platform is indirectly powered in that it can only move once the first platform engages the second platform. The second platform can only move once the first platform reaches its level, i.e. the intermediate height. From there, the two platforms function in unison as the loading deck from the same power source. Accordingly, the first platform may also be referred to as the "master platform" and the second platform may also be referred to as the "slave platform". The first and second platforms are preferably lowered with gravity against controlled hydraulic oil flow.

In some embodiments, the front bridge section may be extend in parallel to the loading deck. The front bridge section may have an extension which is movable along or in a horizontal plane, preferably forwards and backwards, as well as laterally, relative to the loading deck. The front bridge section's extension may be powered by a stepper motor. The aircraft opening may be an open door or a sill of the aircraft and, in use, the front bridge section may be adjusted to ensure that a load such as a wheeled catering trolley can be safely transferred across the loading deck, through the aircraft opening and into the aircraft.

The columns may be fitted with a stabilising arrangement which, when deployed, engages with the ground below the chassis so as to stabilise and support the aircraft loader prior to lifting of the platforms. The stabilising arrangement may include, for example at each of the front slide receivers, a stabilising mechanism. Each stabilising mechanism may include a tubular sliding element and a baseplate, or foot, configured to be manipulated by a hydraulic cylinder (e.g. an outboard fitted cylinder) to displace the foot between the ground and a retracted position.

The stabilising arrangement may extend downwardly from each column and may thus include a sliding element and an adjustable foot, the foot being adjustable between a retracted position in which it is clear of the ground and an extended position in which it engages with the ground below the chassis.

The columns may be aligned along a length of the loader and may be secured to each other, e.g. using a transverse beam.

The frame may be secured to the chassis via a sub-frame. The sub-frame may include spaced apart upright elements and spaced apart cross-members. The cross-members may be configured to receive the cable and pulley system and/or the hydraulic piston and cylinder arrangement.

The columns may have a height above the ground of between 3 and 4 metres.

An upper stopping element, or stopper, may be located at or near a top of each column. The upper stoppers may be configured such that they prevent the sliding portions from being raised above the stoppers (and thus above the top of each column), while the platform supporting portions are located above the sliding portions thus allowing the platforms to be raised to a level or height above the top of the columns. In other words, the aircraft loading height may be higher than a height of the columns above a ground level.

A lower stopping element, or stopper, may be located along the front of each column so as to prevent the second platform from being lowered below the intermediate height. In full-cab embodiments, it will be appreciated that the front platform cannot be lowered below the level of the roof of the cab. However, in half-cab embodiments, the intermediate height may be below the roof of the cab.

According to a second aspect of the invention, there is provided a load lifting apparatus for an aircraft loader, the load lifting apparatus comprising:

a frame which is configured to be secured to a chassis of the aircraft loader, the frame including a pair of vertical columns operatively spaced apart behind a cab of the aircraft loader, wherein each column has a front section and a rear section, and wherein each front section is provided with a front slider and each rear section is provided with a rear slider, the front and rear sliders being configured to be displaced vertically along the columns;

a first platform which is configured to be mounted behind the cab, the first platform being horizontally securable to the rear sliders and selectively displaceable through movement of the rear sliders between a loading floor height and an aircraft loading height, the first platform operatively being driven by a cable system coupled to the rear sliders; and a second platform which is configured to be mounted in front of the first platform, either on top of or at a side of the cab, the second platform being horizontally securable to the front sliders and displaceable through movement of the front sliders between an intermediate height and the aircraft loading height, the intermediate height being a height between the loading floor height and the aircraft loading height, wherein one or both of the first and second platform has mating formations configured such that when the first platform is raised from the loading floor height and reaches the intermediate height, the first and second platforms engage to define a loading deck which is displaceable between the intermediate height and the aircraft loading height, the second platform operatively being driven by the first platform when the platforms are engaged, thereby resulting in the first and second platforms moving in unison between the intermediate height and the aircraft loading height, and such that when the first platform is lowered from the intermediate height the first platform disengages from the second platform to permit the first platform to move back to the loading floor height; and a front bridge section which is connected to the second platform, at least part of the front bridge section being displaceable relative to the second platform to accommodate an aircraft opening, in use.

In the second aspect of the invention, the aircraft loader and the load lifting apparatus may further include one or more of the features recited above with reference to the first aspect of the invention.

Embodiments of the invention will now be described, by way of example only, with reference to the accompanying drawings.

DETAILED DESCRIPTION WITH REFERENCE TO THE DRAWINGS

Figure 1:
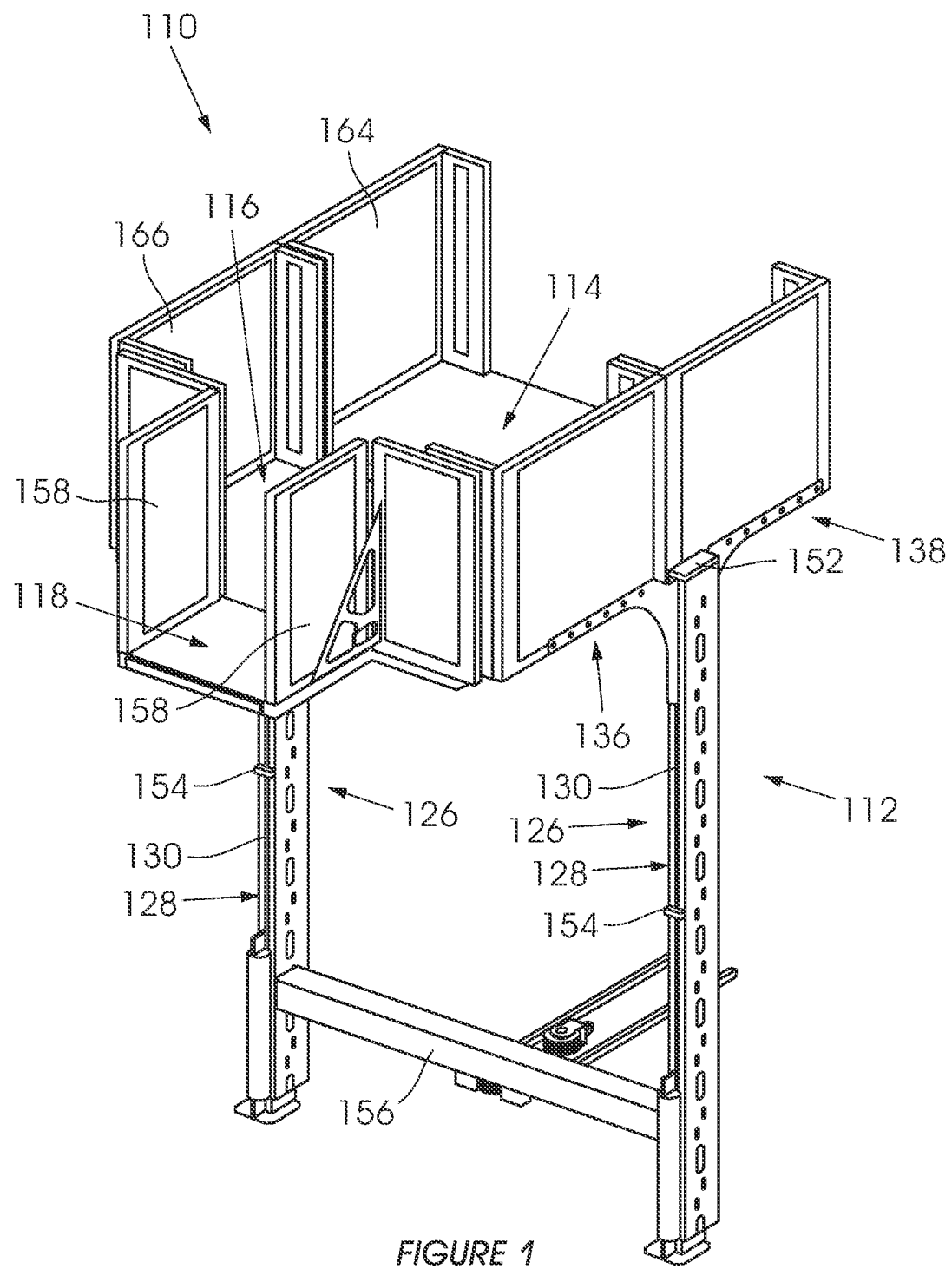
FIG. 1 is a front perspective view of parts of a first embodiment of a load lifting apparatus for an aircraft loader, the load lifting apparatus being configured for use in a full-cab loader.
Figure 2:
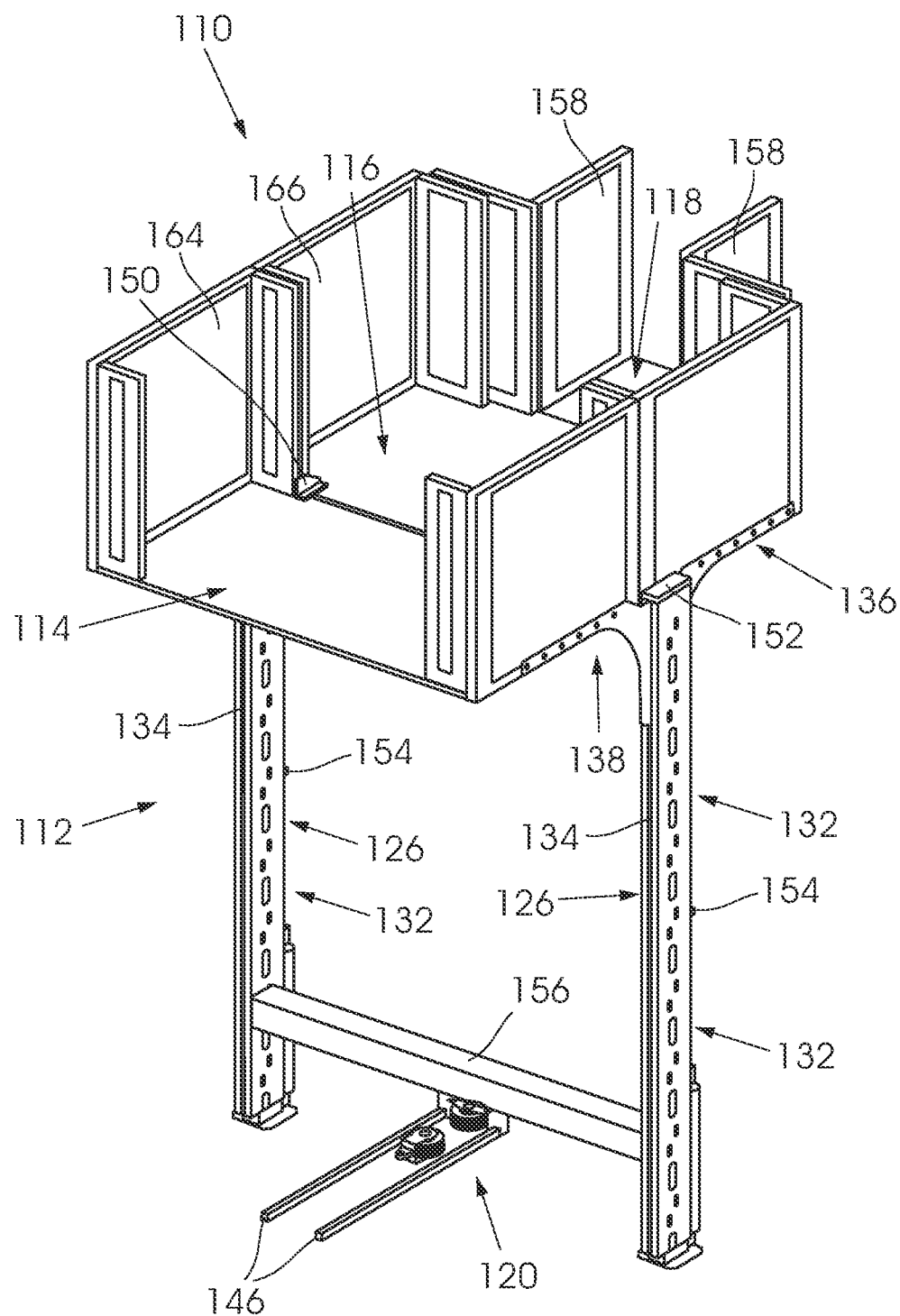
FIG. 2 is a rear perspective view of the load lifting apparatus of FIG. 1.

The following description is provided as an enabling teaching of the invention, is illustrative of principles associated with the invention and is not intended to limit the scope of the invention. Changes may be made to the embodiments depicted and described, while still attaining results of the present invention and/or without departing from the scope of the invention. Furthermore, it will be understood that some results or advantages of the present invention may be attained by selecting some of the features of the present invention without utilising other features. Accordingly, those skilled in the art will recognise that modifications and adaptations to the present invention may be possible and may even be desirable in certain circumstances, and may form part of the present invention. Parts are shown in broken lines in some of the drawings better to illustrate certain aspects of the invention. Furthermore, some parts are omitted from certain drawings in order to simplify the drawings and thus facilitate understanding of aspects of the invention.

A first embodiment of a loading lifting apparatus 110 (hereafter simply "the apparatus 110") is shown in FIGS. 1 to 6 and a first embodiment of an aircraft loader 100 (hereafter simply "the loader 100"), including the apparatus 110, is shown in FIGS. 7 to 12. In this example, the loader 100 is a wheeled vehicle in the form of a full-cab truck used for loading a narrow-body (single-aisle) aircraft, particularly with catering trolleys.

The apparatus 110 makes use of dual-slide posts referred to below as "columns", as well as a system of pulleys and cables to permit platforms to be lifted higher than a height of the columns.

The apparatus 110 includes a frame 112, a first horizontal platform 114, a second horizontal platform 116, a front bridge section 118 and a cable system 120 powered by a hydraulic piston and cylinder arrangement 122 (hereafter "the cylinder arrangement 122").

The frame 112 is operatively secured to a chassis 124 of the loader 100 and includes a pair of vertical columns 126 spaced apart behind a cab 128 of the loader. The columns 126 are aligned along the length of the loader 100 and in this embodiment they are located in the front corners of a load box 160 of the loader 100 (the load box 160 defines a loading zone 162 therein). A transverse beam 156 extends between the columns 126 to provide structural support and to ensure that they remain evenly spaced apart along the lengths thereof.

When viewed from the side (see FIGS. 4 and 7 to 9), it will be evident that the columns 126 are positioned so as to ensure the loads of the two platforms 114, 116 are balance by cantilever effect. The positioning also helps to reduce friction on the sliders described below.

In this example, each column has a height of approximately 3 metres. Preferably, when installed in the loader, the top of the columns 126 is at a height of less than 4 metres.

The frame 112 and transverse beam 156 may rest on and be secured to a sub-frame (not shown) that spans a substantial part of the chassis 124 of the loader 100. Preferably such a sub-frame has upright members and cross-members and the cross-members may be used to secure a cable system and its hydraulic driving system (described below) in position.

The exact dimensions and position of the frame 112, sub-frame and platforms 114, 116 may be varied and it will be appreciated that these depend on factors such as truck dimensions and manufacturer's requirements.

Each column 126 has a front section 128 defining a front slide receiver with a vertical slot 130 and a rear section 132 defining a rear slide receiver, also with a vertical slot 134. Each slot 130, 134 is configured to receive a slider used to move the platforms 114 and 116 upwardly and downwardly relatively to the columns 126 in use. More specifically, each front section 128 has a front slider 136 and each rear section 132 has a rear slider 138. The slots 130, 134 are essentially vertical tracks in which the sliders 136, 138 are held captive and along which they run to displace the platforms 114, 116.

The slide receivers may be manufactured using square tubes. Each tube may be provided with a slot in its front face and the tubes may then be secured back-to-back, thereby to define a column 126. The slide receivers may thus be substantially U-shaped in cross-section.

As mentioned above, the apparatus 110 makes use of two platforms 114, 116. The exact shape and dimensions of each platform 114, 116, as well as the front bridge section 118 connected to the second platform 116, may be varied to accommodate the dimensions of the loader used and to suit the loading and operating requirements of the installation.

Side walls 164 extend upwardly from the first platform 114, while the front and the rear of the first platform 114 are substantially open (i.e. free from walls) to facilitate loading of items onto and from the platform 114. Similarly, side walls 166 extend upwardly from the second platform 116 while its rear its substantially open. The front of the second platform 116 is provided with wall sections 168 with doors 158 there between. The doors 158 are shown in an open condition in the drawings, but it should be appreciated that the doors 158 may be closed when required, e.g. when lifting or lowering a load. The doors 158 open up to expose the front bridge section 118 which operatively bridges the gap between the platforms 114, 116 and the aircraft. The front bridge section 118 includes an extension 178 which can be moved forwardly, rearwardly and from side to side using an electrical stepper motor (not shown).

The first platform 114 is mounted between the pair of rear sliders 138 and the second platform 116 is mounted between the pair of front sliders 136. As shown in the drawings, the columns 126 are located at front corners of the first platform 114 and at rear corners of the second platform 116.

Figure 3:
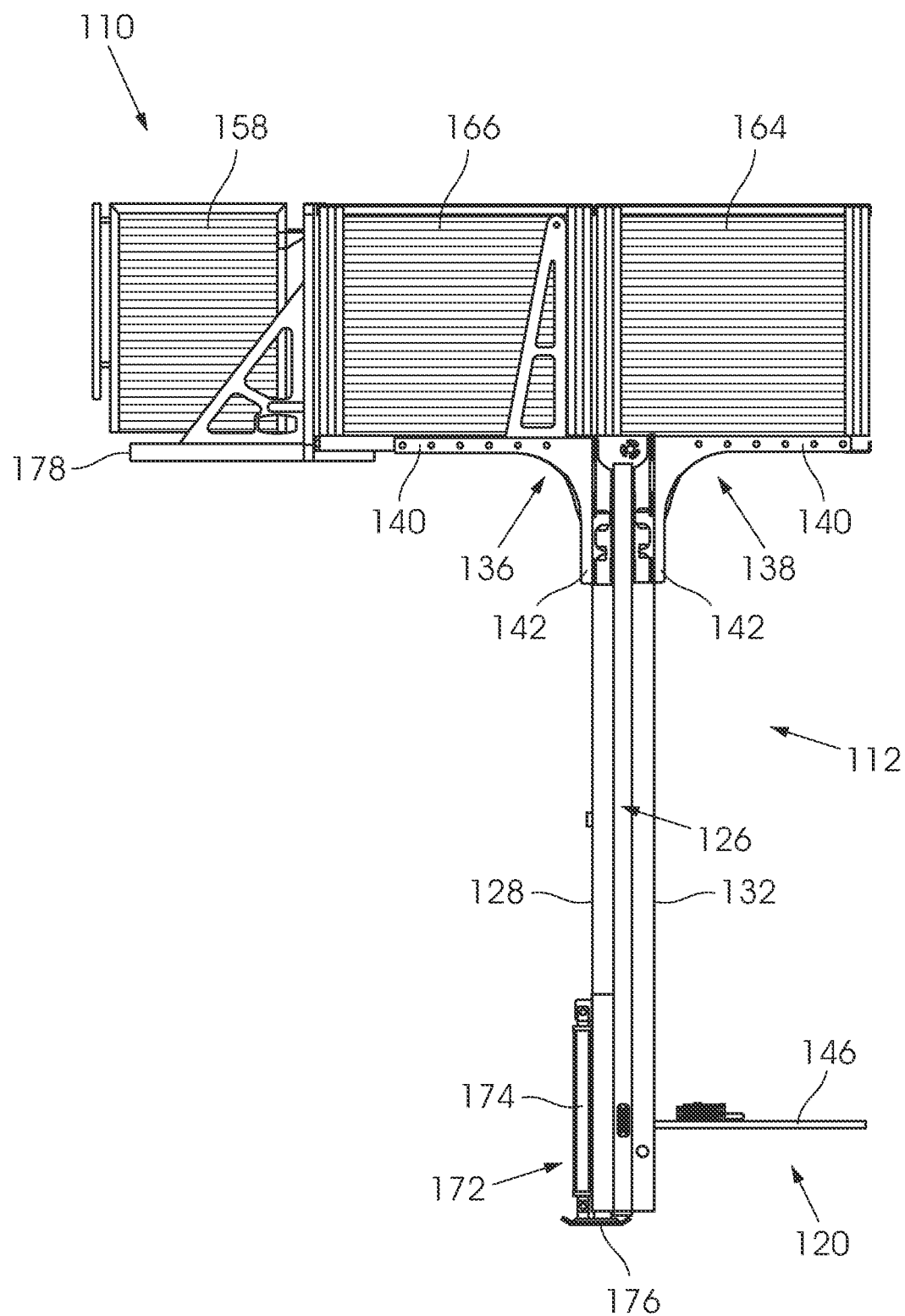
FIG. 3 is a side view of the load lifting apparatus of FIG. 1.
Figure 4:
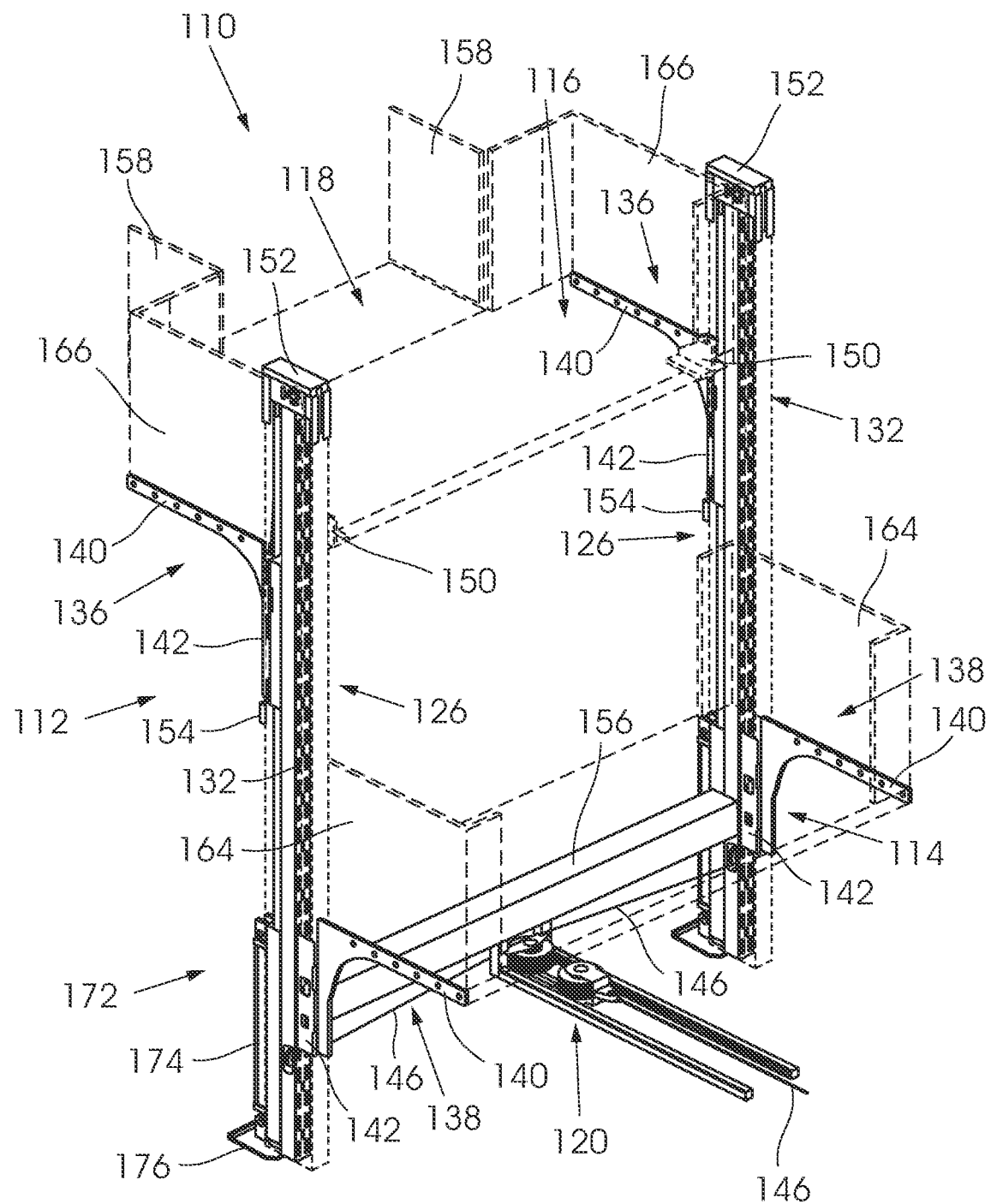
FIG. 4 is a rear perspective view of parts of the load lifting apparatus of FIG. 1, illustrating a first platform thereof at a loading floor height and a second platform thereof at an intermediate height.
Figure 5:
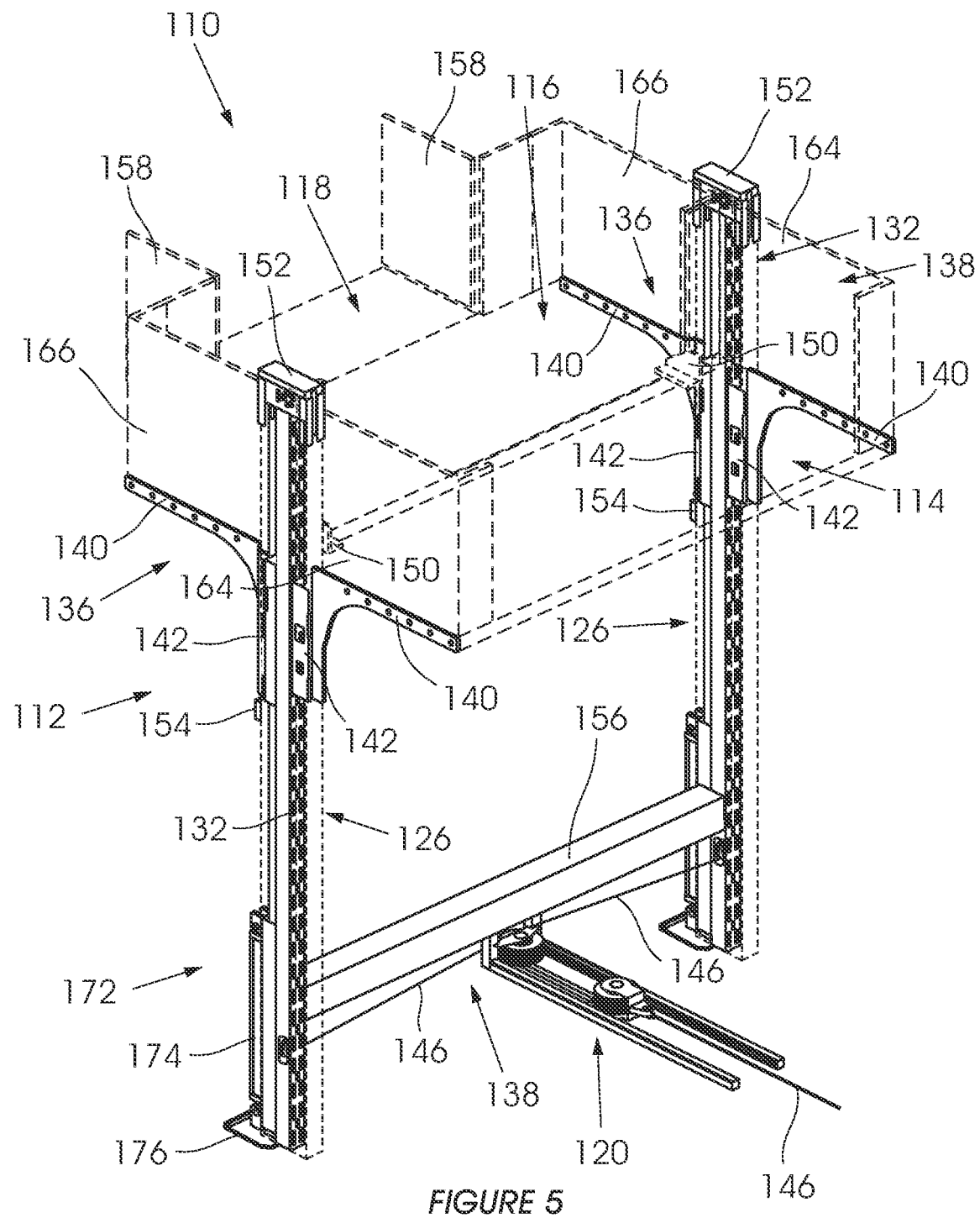
FIG. 5 is a rear perspective view of parts of the load lifting apparatus of FIG. 1, illustrating the first platform and the second platform at the intermediate height, wherein the platforms engage to form a loading deck.

As is best shown in FIG. 3, each slider 136, 138 has an upper portion referred to as its platform supporting portion 140 and a lower portion referred to as its sliding portion 142. The portions 140, 142 extend generally perpendicular to each other thus making the slider 136, 138 resemble an "L" shape or inverted "L" shape. Each platform 114, 116 is secured between two platform supporting portions 140, while the sliding portions 142 are held captive in the slots 130, 134. For example, sides of each platform 114, 116 may be bolted to the respective platform supporting portions 140 of the sliders 136/138.

The design and configuration of the sliders 136/138 are particularly advantageous in that this allows the platforms 114, 116 to be lifted higher than the height of the columns 126. While the sliding portions 142 are held captive in and restricted by the columns 126 (i.e. the sliding portions 142 themselves cannot move above the columns 126), the supporting portions 140 are located above the sliding portions 142. The platforms 114, 116 are at the same level as the supporting portions 140. Accordingly, when the sliders 136/138 are raised to the highest possible point in this example embodiment, the platforms 114, 116 are higher than the columns 126. In this way, the desired loading levels, e.g. aircraft door sill heights of up to 4 metres (in the case of narrow-body aircraft) can be accommodated without the column height exceeding for instance a maximum prescribed height.

The cable system 120 and cylinder arrangement 122 are located below a loading floor 144 of the loader 100 and may be mounted in position using a sub-frame as described above.

In this example embodiment, the cable system 120 is in the form of a double pulley system with a pair of cables 146 connected to the cylinder arrangement 122 and to the rear sliders 138. In this example, a cable 146 is secured to a sliding portion 142 of a respective rear slider 138 via a spring-loaded safety brake device (not shown) located inside of the column 126. In use, this feature prevents a slider from dropping in the case of tension loss on a cable which may result from a cable breaking or another fault in the system 120.

The cylinder arrangement 122 is in the form of a hydraulic ram mounted to a sub-frame of the frame 112 underneath the loading floor 144 (see FIGS. 7 to 10) and powered from the engine of the loader 100. In this example, the cylinder arrangement 122 utilises a single stroke, single acting piston and cylinder oriented along the length of the loader 100, with a piston stroke length of 1.5 m. In use, movement of a piston rod (not shown) of the cylinder arrangement 122 drives the cable system 120 so as to raise and lower the sliders 138 and thus the platform 114.

Figure 6:
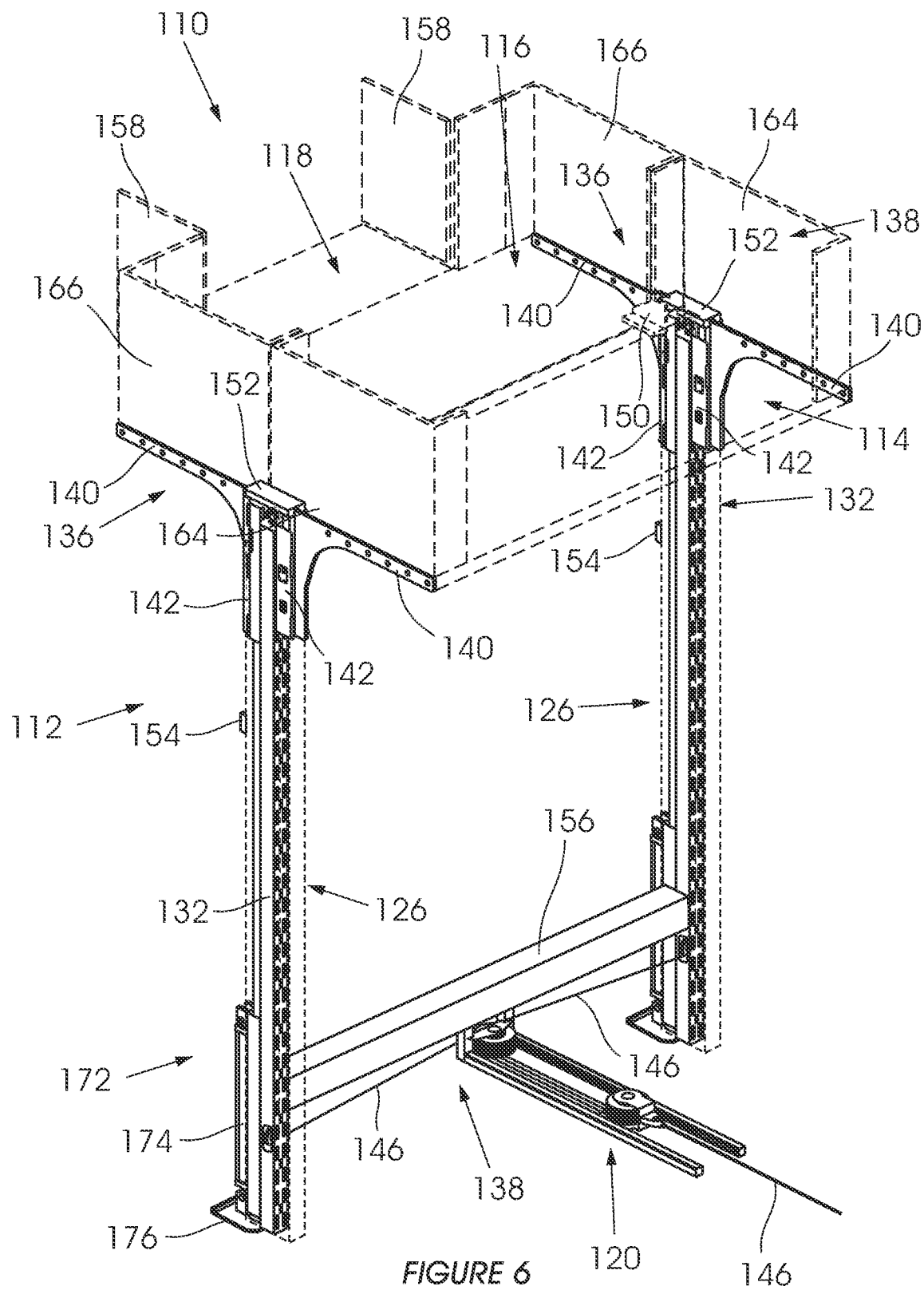
FIG. 6 is a rear perspective view of parts of the load lifting apparatus of FIG. 1, illustrating the first platform and the second platform, or loading deck, raised to an aircraft loading height.

As shown in FIGS. 7 to 12, the first platform 114 is horizontally mounted behind a cab 148 of the loader 100 and the second platform 116 is located above the cab 148. The first platform 114 is selectively displaceable through movement of the rear sliders 138 via the cable system 120. The first platform 114 can be moved vertically (through sliding motion of the sliders 138) between its lowest position at a loading floor height (see FIG. 4) and its highest position at an aircraft loading height (see FIG. 6). The first platform 114 can thus be moved vertically upwardly and downwardly along the entire length of the columns 126. Motion of the second platform 116 is more limited. The second platform 116 can be moved vertically (through sliding motion of the sliders 140) between the its lowest position at an intermediate height (see FIGS. 4 and 5) and its highest position which is also the aircraft loading height (see FIG. 6). The intermediate height is a height just above the roof 168 of the cab 148. The load box 160 has an opening in a front upper region of its roof 170 to allow the first platform 114 to be lifted substantially out of the load box 160 and up to the aircraft loading height as shown in FIG. 6.

An upper stopper 152 is located at the top of each column 126 to prevent the sliding portions 142 from sliding out of the columns 126, i.e. to hold them captive therein. In this embodiment, the upper stopper 152 is in the form of a plate covering the column 126, acting both as a lid for components of the cable system 120 and as a platform stopper.

A lower stopper 154 is located along the front of each column 126 so as to prevent the second platform 116 from being lowered below the intermediate height. While in this embodiment it is impossible for the platform 116 to be lowered lower than the roof 168, a stopper 154 is nevertheless useful in preventing damage and allowing precise displacement. In a half-cab embodiment such as the second embodiment described with reference to FIGS. 13 to 17 below, the intermediate height is lower as the lower stopper is located lower than the roof of the cab, with the second platform travelling in a plane at the side of the cab.

While the first platform 114 is driven directly using the cable system 120 and cylinder arrangement 122, the second platform 116 is not directly powered or driven. The second platform 116 can only be raised and lowered when the platforms 114, 116 are engaged to define a loading deck of the loader 100. Thus the first platform 114 is the master platform and the second platform 116 is the slave platform.

In order to establish engagement or locking between the platforms 114, 116, the second platform 116 has a pair of flanges 150 in rear corner regions thereof. Each flange 150 has one end secured to the platform 116 and a second end which projects past the second platform 116 and into a transverse plane traversed by the first platform 114. In this way the platforms 114, 116 mate when the first platform 114 reaches the second platform's height and they then move in unison up to the aircraft loading height.

The front section 128 of each column 126 is fitted with a stabilising arrangement 172. The stabilising arrangement 172 includes a tubular sliding element 174 and a foot 176 adjusted using an outboard fitted hydraulic cylinder. The foot 176 is displaced between a resting position (see FIG. 3) in which it is retracted and an extended position (see FIGS. 7 to 10) in which it engages with the ground below the chassis 124 to support and stabilise the apparatus 110. The arrangement 172 is preferably manipulated into the extended position prior to loading activities.

Figure 7:
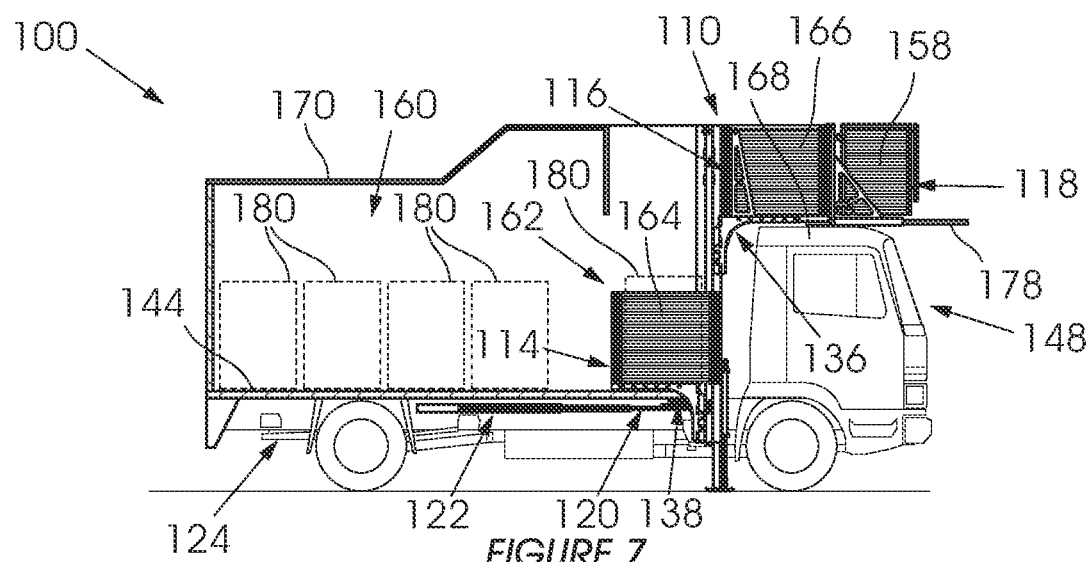
FIG. 7 is a partially sectional side view of a first embodiment of an aircraft loader which includes the load lifting apparatus of FIG. 1, the aircraft loader being a full-cab loader, illustrating the first platform at the loading floor height and the second platform at the intermediate height.

Referring now specifically to FIGS. 7 to 12, in use, with the loader 100 parked next to an aircraft 102 and the stabilising arrangement 172 in position to support the apparatus 110, the process typically starts with the first platform 114 at the loading floor height and the second platform 116 at the intermediate height, suspended just above the cab 148. The two platforms 114, 116 thus start from different heights. Items 180, e.g. wheeled catering trolleys, are then moved from the loading floor 144 and onto the first platform 114. Refer to FIG. 7 in this regard.

Figure 8:
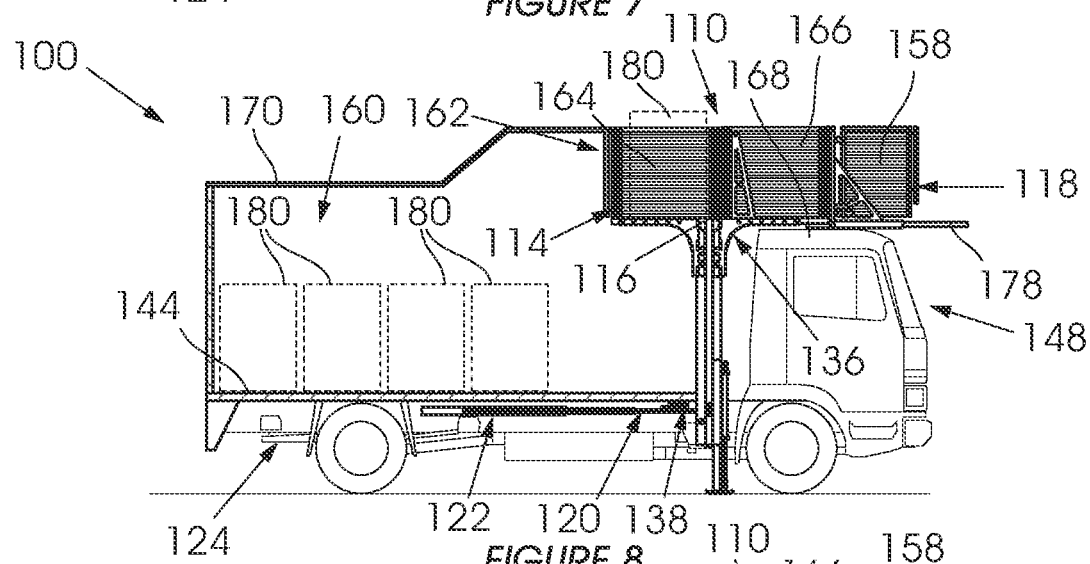
FIG. 8 is a partially sectional side view of the aircraft loader of FIG. 7, illustrating the first platform and the second platform at the intermediate height, wherein the platforms engage to form the loading deck.

Then, referring to FIG. 8, the first platform 114 is raised to the intermediate height while carrying a load. Here the platforms 114, 116 join/engage in the manner described above to form a loading deck. The second platform 116 is the slave platform, meaning it can only move when engaged with the first platform 114.

Figure 9:
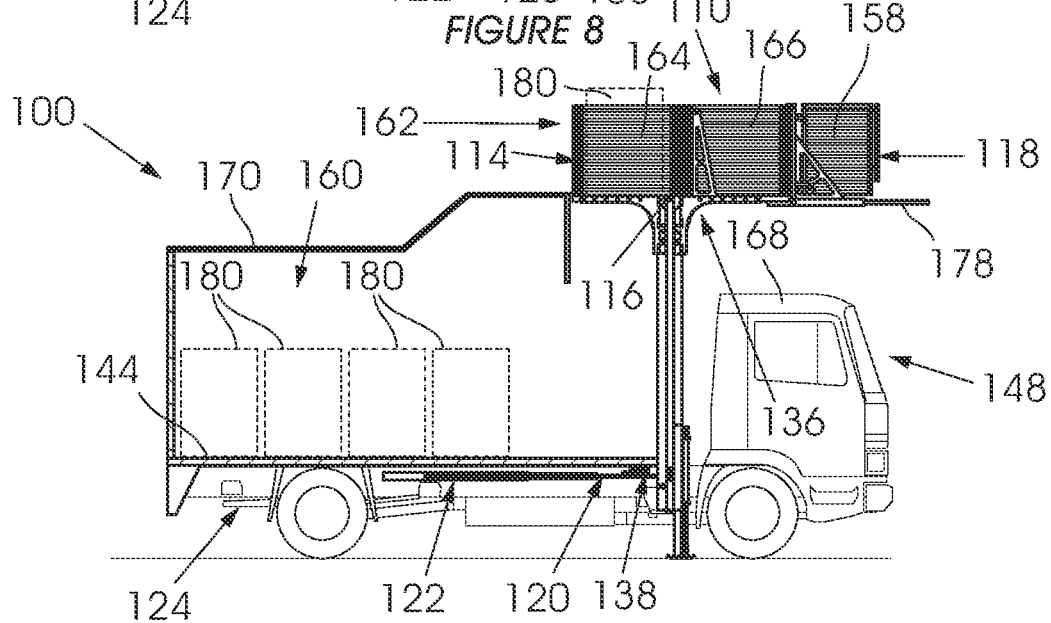
FIG. 9 is a partially sectional side view of the aircraft loader of FIG. 7, illustrating the loading deck raised to the aircraft loading height.
Figure 10:
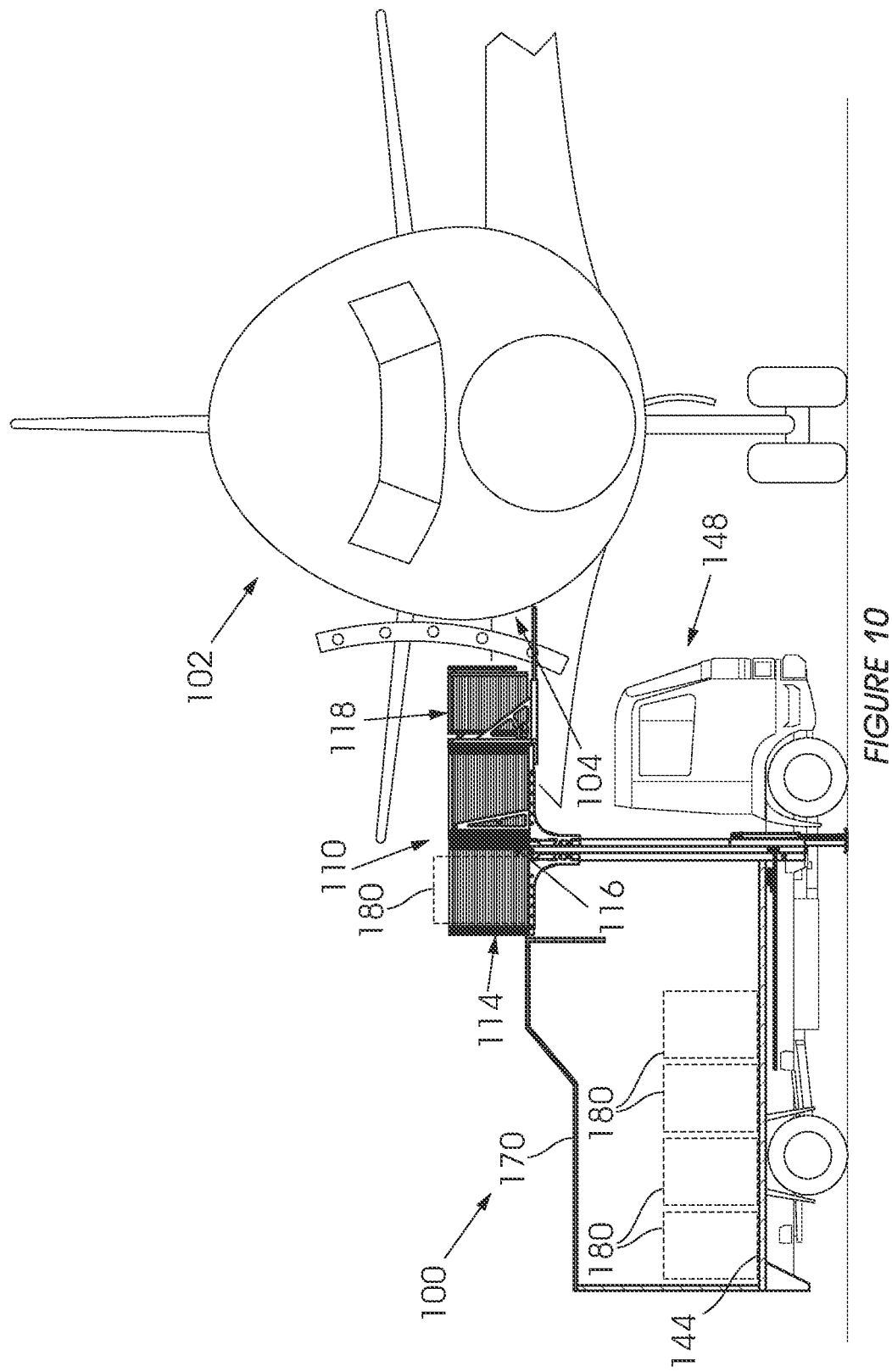
FIG. 10 is a partially sectional side view of the aircraft loader of FIG. 7, in use, parked at the side of a narrow-body aircraft.
Figure 11:
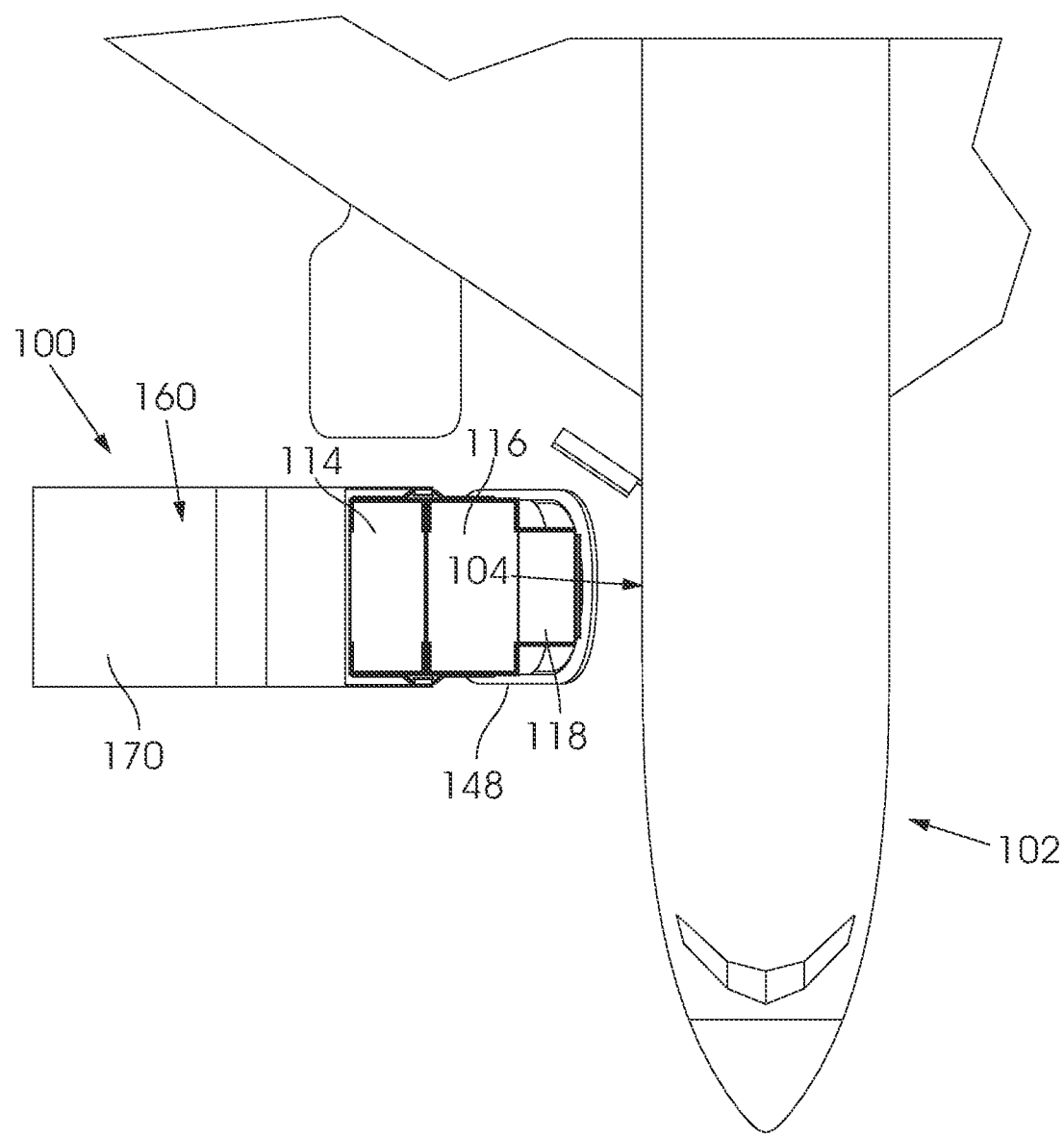
FIG. 11 is a conceptual illustration, from the top, of the aircraft loader of FIG. 7 parked at the side of a narrow-body aircraft.
Figure 12:
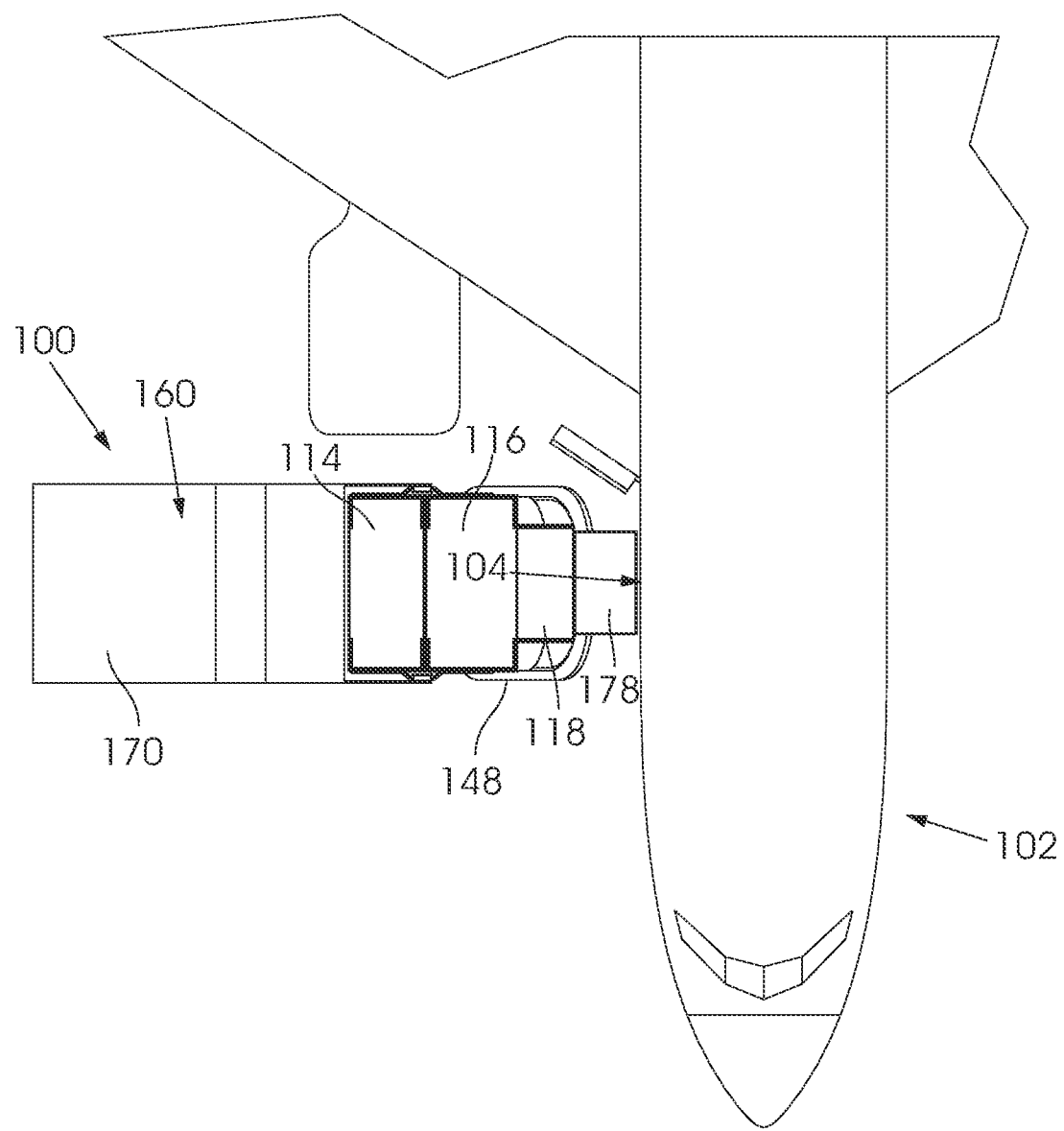
FIG. 12 is another conceptual illustration, from the top, of the aircraft loader of FIG. 7 parked at the side of the narrow-body aircraft, wherein a front bridge section of the aircraft loader is adjusted to accommodate an opening of the aircraft for loading items onto the aircraft.

From the position shown in FIG. 8 the platforms 114, 116 travel in unison. Referring to FIG. 9, the platforms 114, 116 or loading deck then move to a third position in which the loading deck is located at the aircraft loading height.

Typically once the loading deck is in the appropriate position, the front bridge section 118 is adjusted to mate with the aircraft 102, e.g. to be aligned with a sill of the aircraft door 104. As mentioned above, the front bridge section 118 has the motorised extension 178 which can be moved relative to the loading deck and the rest of the front bridge section 118 as required before loading the items 180 (see FIG. 12). This ensures that items 180, e.g. a wheeled catering trolley can be safely transferred across the loading deck and into the aircraft.

Once loading has been completed, the platforms 114, 116 are lowered in unison with gravity against controlled hydraulic oil flow. Once the platforms 114, 116 reach the intermediate height, the second platform 116 also reaches the lower stoppers 154 and cannot be lowered further. As a result, the platforms 114, 116 disengage and the first platform 114 travels alone back to the bottom of the loading zone 162 until it reaches the loading floor 144. The stabilising arrangement 172 can be retracted, after which the loader 100 may travel away from the aircraft 102.

It should be appreciated that the loader 100 may include a suitable controller, e.g. a controller located on the first platform, which is used to send commands to the arrangement 122 for raising or lowering the platforms 114, 116. Alternatively or additionally, a remote control device may be employed for this purpose.

Figure 13:
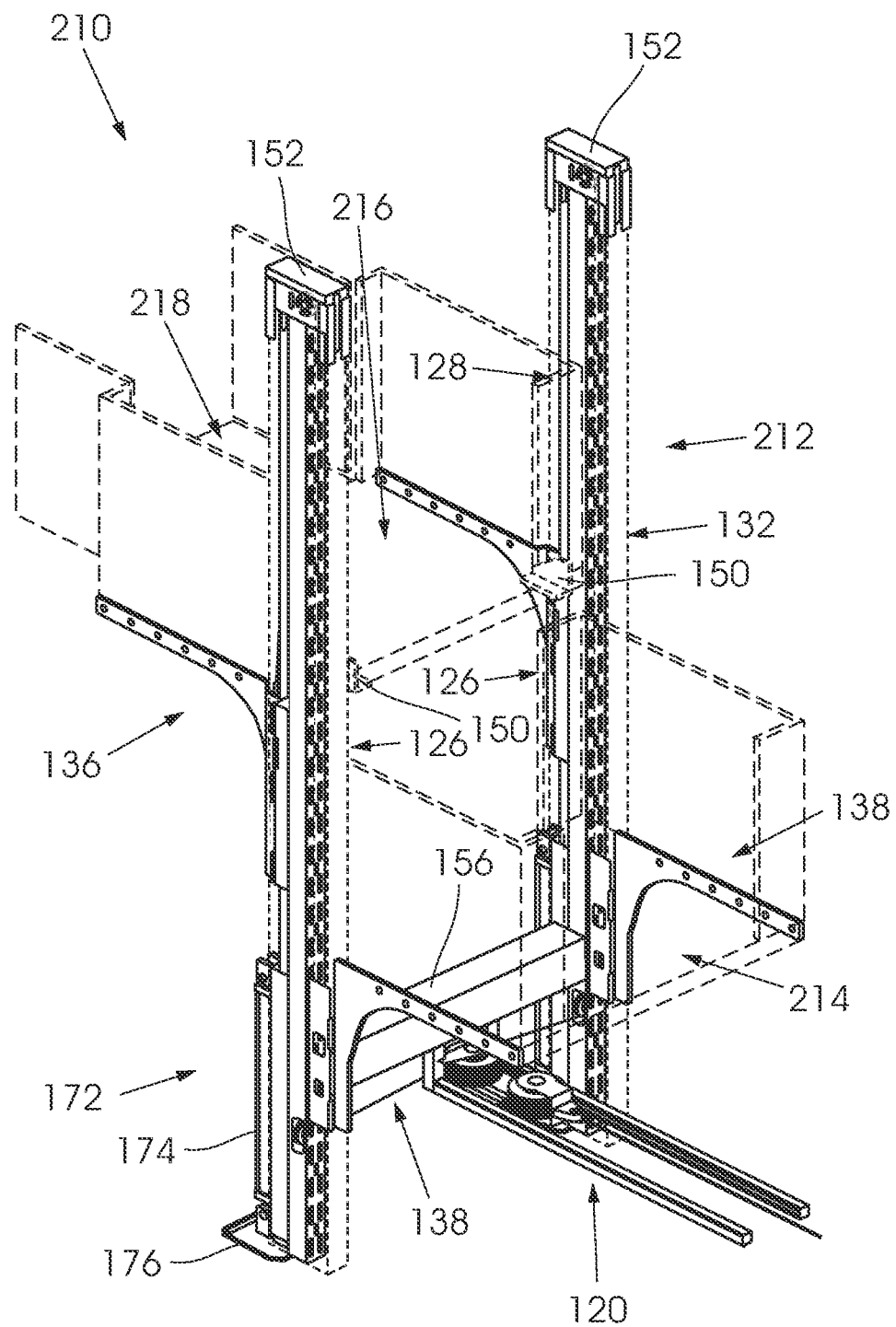
FIG. 13 is a rear perspective view of parts of a second embodiment of a load lifting apparatus, the load lifting apparatus being configured for use in a half-cab loader, illustrating a first platform thereof at a loading floor height and a second platform thereof at an intermediate height.

A second embodiment of a loading lifting apparatus 210 (hereafter simply "the apparatus 210") is shown in FIG. 13 and a second embodiment of an aircraft loader 200 (hereafter simply "the loader 200"), including the apparatus 210, is shown in FIGS. 14 to 17. In this example, the loader 100 is a wheeled vehicle in the form of a half-cab loader for loading a narrow-body aircraft with items such as catering trolleys.

The second embodiment of the load lifting apparatus 210 is highly similar to the first embodiment 110. Furthermore, the second embodiment of the loader 200 is similar to the first embodiment 100. Like reference numerals refer to like components and arrangements. The principles of construction and operation will not be repeated in the description below, which serves merely to highlight the differences between the embodiments.

Figure 14:
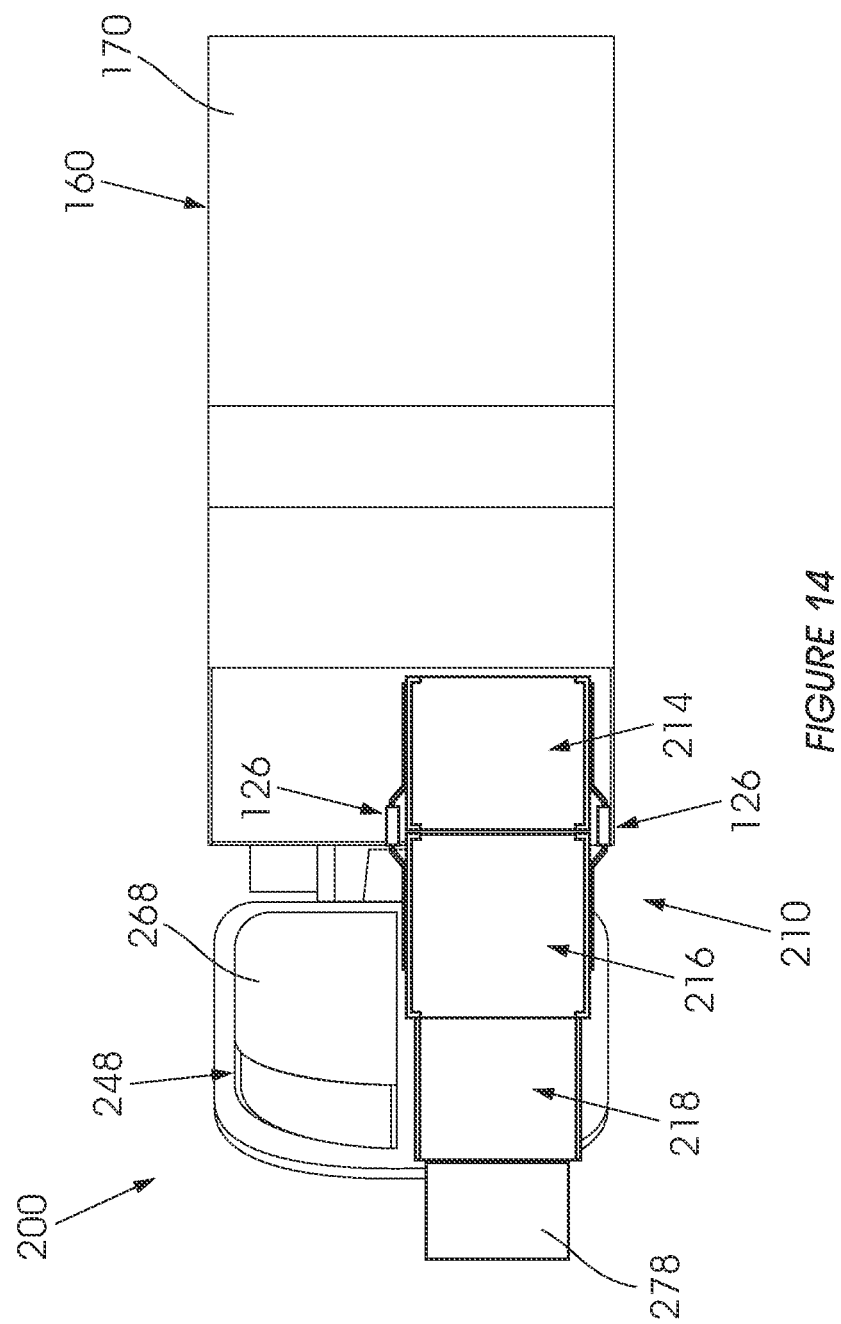
FIG. 14 is a conceptual illustration, from the top, of a second embodiment of an aircraft loader which includes the load lifting apparatus of FIG. 13.

Referring to FIG. 14, the primary difference between the loaders 100 and 200 is that the loader 200 has a so-called "half cab" 248. Accordingly, the second platform 214 of the loader 200 is located at the side of the cab 248 (not above the cab 148 as in the first embodiment described above). In order to accommodate the half-cab dimensions, the first platform 212, second platform 214, front bridge section 216 and bridge extension 278 are all narrower. Similarly, the frame 212 of the loader 200 is narrower as the columns 126 are spaced closer to each other. One of the columns 126 is located in the front left corner of the load box 160 while the other column 126 is located centrally in the front of the load box 160.

Figure 15:
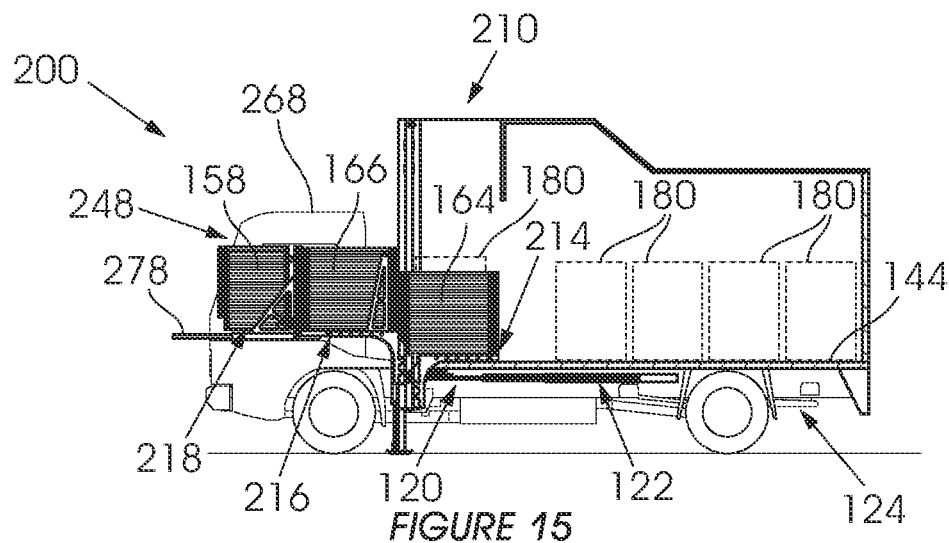
FIG. 15 is a partially sectional side view of the aircraft loader of FIG. 14, illustrating the first platform at the loading floor height and the second platform at the intermediate height.
Figure 16:
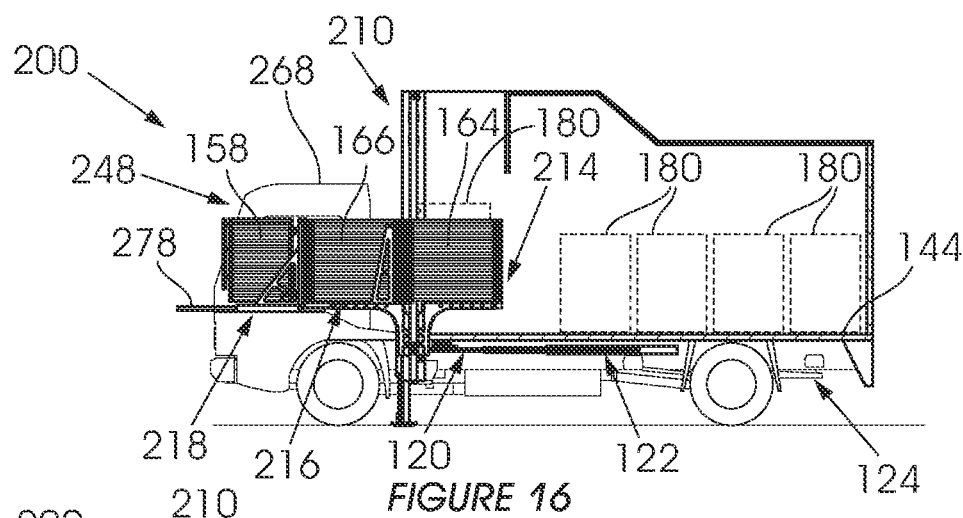
FIG. 16 is a partially sectional side view of the aircraft loader of FIG. 14, illustrating the first platform and the second platform at the intermediate height, wherein the platforms engage to form a loading deck.
Figure 17:
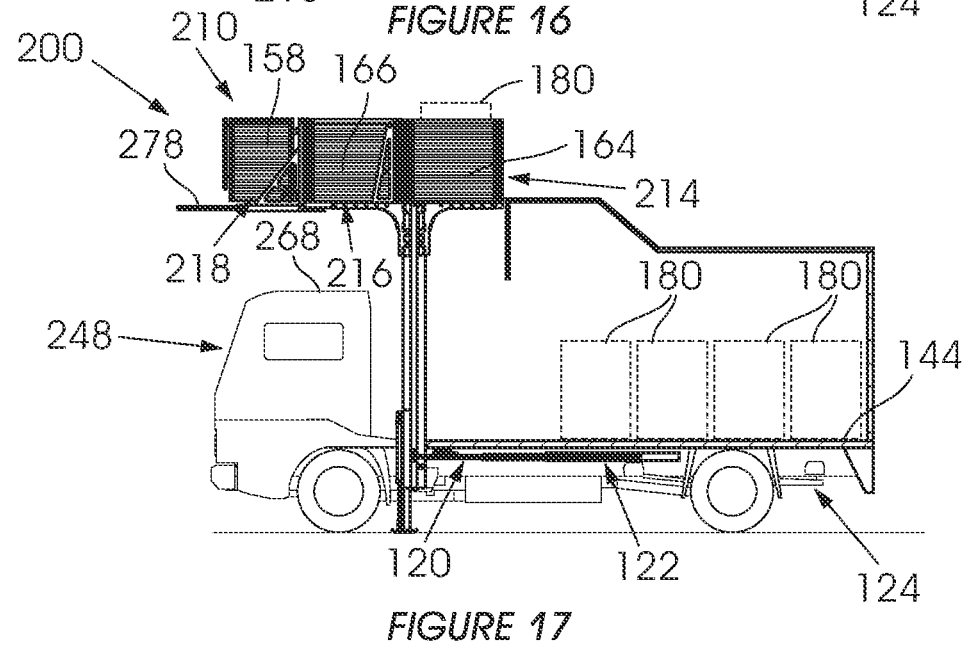
FIG. 17 is a partially sectional side view of the aircraft loader of FIG. 14, illustrating the loading deck raised to an aircraft loading height.

Referring to FIGS. 15 to 17, the loader 200 operates based on substantially the same principles and mechanisms as the loader 100. The primary difference resides in the intermediate height employed in the loader 200 being lower than the roof 268 of the cab 248.

As an example, in the case of a full-cab loader such as the loader 100, the columns may be approximately 3 m in height with the intermediate height being about 2.2 m above the loading floor, while in the case of a half-cab loader such as the loader 200, the intermediate height may be lowered to for instance 1.3 m above the loading floor. It will be appreciated that as the intermediate height is lower, the loader 200 may have a lower stopper (not shown) similar to the stopper 154, but which is located lower down along each column 126.

In this embodiment, the process also typically starts with the first platform 214 at the loading floor height and the second platform 216 at the intermediate height, as shown in FIG. 15. The two platforms 214, 216 thus also start from different heights, but they are closer to each other in the loader 200. Items 180 are then moved from the loading floor 144 and onto the first platform 214 as shown in FIG. 15.

Then, referring to FIG. 16, the first platform 214 is raised to the intermediate height with the load it is carrying. Here the platforms 214, 216 join/engage in the manner described above to form a loading deck.

From the position shown in FIG. 16 the platforms 214, 216 travel in unison. Referring to FIG. 17, the platforms 214, 216 or loading deck then move to a third position in which the loading deck is located at the aircraft loading height. The remainder of the process can be carried out as described with reference to FIGS. 1 to 12 above.

Embodiments of the present invention may address some of the issues identified in the "Background" section above, at least to some extent, and the Inventors have identified numerous possible advantages. In addition to the possible advantages mentioned above, other possible advantages are set out below.

A loader according to the invention may utilise three distinct platform positions. Firstly, in a resting position the master platform can be loaded at loading floor level while the slave platform rests at the intermediate height. Then, in an engaging position the master platform is raised to a "marriage point" so that the two platforms define a single loading deck. Then, the platforms are raised together to a third position which is the desired height needed to reach for instance a doorsill height of the aircraft. As explained above, in this third position, both the first and second platforms may be located not only above the cab's roof but also higher than the columns and/or higher than the vehicle's load box/body. This may be particularly useful where loaders (when in a driving condition) are limited to a certain height, e.g. 4 m.

Embodiments of the invention provide a lighter and/or smaller lifting arrangement, meaning that the vehicle can deploy the platforms faster and load more aircraft in less time. Furthermore, the load lifting apparatus can be installed on a lighter and lower-cost chassis, saving capital and other costs such as running and insurance costs. Particularly in catering applications where the only loads to be lifted are, for instance, catering trolleys and other relatively small catering items, embodiments of the invention eliminate the need for large, heavy and expensive lifting apparatus such as scissor mechanisms.

To achieve the travel height required from the first platform, e.g. 3 m as mentioned above, at even speed and pressure, a single stroke, single acting hydraulic cylinder (parallel to the vehicle length) with a stroke of about 1500 mm may advantageously be used. This is in contrast to existing lifting systems of which the Inventors are aware that utilise a hydraulic cylinder transversely, limiting the stroke to the width of the loader vehicle. The cylinder stroke length may be altered to accommodate the required loading heights.

Embodiments of the invention utilise "inverted L shape" sliders that move along columns are able to exceed the standard travelling height by extending past the columns, as described above. The system utilises sets of slide receivers that form a single column.

As explained above, embodiments of the invention provide one master platform and one slave platform, which together may act to balance the load lifting apparatus and increase dimensions of the loading deck. The use of a master-slave relationship may eliminate the need to provide a separate lifting mechanism and/or power supply above the cab roof to manipulate the second platform.

It will be appreciated by those skilled in the art that there are many variations to the invention as herein defined and/or described with reference to the accompanying drawings, without departing from the spirit and scope of this disclosure. For example, in the examples provided and illustrated in the drawings, the aircraft loader is in the form of an aircraft catering truck for a narrow-body aircraft. However, it should be appreciated the principles of the invention may be applied to other types of aircraft loaders.

The invention claimed is:

1. An aircraft loader which comprises a chassis, a cab, a loading box which has a loading floor and a load lifting apparatus, wherein the load lifting apparatus comprises:
   a frame which is secured to the chassis, the frame including a pair of vertical columns spaced apart behind the cab, wherein each column has a front section and a rear section, and wherein each front section is provided with a front slider and each rear section is provided with a rear slider, the front and rear sliders being configured to be displaced vertically along the columns, wherein each of the front and rear sliders has a platform supporting portion and a sliding portion, the platform supporting portion being located above the sliding portion;
   a first horizontal platform mounted behind the cab, the first platform being secured to the rear sliders and selectively displaceable through movement of the rear sliders between a loading floor height and an aircraft loading height, the first platform being driven by a cable system coupled to the rear sliders, wherein a loading zone is defined inside of the loading box, with the first platform being located in the loading zone when at the loading floor height; and
   a second horizontal platform mounted in front of the first platform, either on top of or at a side of the cab, the second platform secured to the front sliders and displaceable through movement of the front sliders and the first platform between an intermediate height and the aircraft loading height, the intermediate height being a height between the loading floor height and the aircraft loading height, wherein one or both of the first and second platform has mating formations configured such that when the first platform is raised from the loading floor height and reaches the intermediate height, the first and second platforms engage to define a loading deck which is displaceable between the intermediate height and the aircraft loading height, the second platform being driven by the first platform when the platforms are engaged, thereby resulting in the first and second platforms moving in unison between the intermediate height and the aircraft loading height, and such that when the first platform is lowered from the intermediate height the first platform disengages from the second platform to permit the first platform to move back to the loading floor height; and
   a front bridge section which is connected to the second platform, at least part of the front bridge section being displaceable relative to the second platform to accommodate an aircraft opening, in use.

2. The aircraft loader according to claim 1, wherein each column includes a front slide receiver and a rear slide receiver, wherein each front slide receiver has a vertical slot for receiving one of the front sliders, and wherein each rear slide receiver has a vertical slot for receiving one of the rear sliders.

3. The aircraft loader according to claim 2, wherein the sliding portion of each the front and rear sliders is received in the vertical slot of a corresponding one of the slide receivers.

4. The aircraft loader according to claim 3, wherein an upper stopping element is located at a top of each column, the upper stopping elements being configured such that they prevent the sliding portions from being raised above the upper stopping elements and thus above the columns, while the platform supporting portions are configured to be raised to a height above the top of the columns, thereby permitting the aircraft loading height to be higher than a height of the columns above a ground level.

5. The aircraft loader according to claim 1, wherein the mating formations include one or more flanges on the second platform, wherein each flange extends from the second platform and projects into a transverse plane traversed by the first platform.

6. The aircraft loader according to claim 1, wherein the cable system includes at least two cables, each cable being secured to a bottom region of a respective one of the rear sliders.

7. The aircraft loader according to claim 6, wherein the cable system is a cable and pulley system driven by a hydraulic piston and cylinder arrangement, wherein the hydraulic piston and cylinder arrangement is oriented along a length of the loader.

8. The aircraft loader according to claim 7, wherein the hydraulic piston and cylinder arrangement includes a single stroke, single acting cylinder with a piston stroke length of greater than 1 m.

9. The aircraft loader according to claim 1, wherein the front bridge section has an extension which is movable in a horizontal plane relative to the loading deck.

10. The aircraft loader according to claim 1, wherein the columns are fitted with a stabilising arrangement which, when deployed, engages with the ground below the chassis so as to stabilise and support the aircraft loader prior to lifting of the first and second platforms.

11. The aircraft loader according to claim 1 wherein the loading box has an opening in its roof to allow the first platform to be lifted substantially out of the loading box and up to the aircraft loading height.

12. The aircraft loader according to claim 1, wherein the aircraft loader is an aircraft catering truck for a narrow-body aircraft.

13. A load lifting apparatus for an aircraft loader, the aircraft loader comprising a chassis, a cab, and a loading box which has a loading floor, and the load lifting apparatus comprising:
  a frame which is configured to be secured to the chassis of the aircraft loader, the frame including a pair of vertical columns operatively spaced apart behind the cab of the aircraft loader, wherein each column has a front section and a rear section, and wherein each front section is provided with a front slider and each rear section is provided with a rear slider, the front and rear sliders being configured to be displaced vertically along the columns, wherein each of the front and rear sliders has a platform supporting portion and a sliding portion, the platform supporting portion being located above the sliding portion;
  a first platform which is configured to be mounted behind the cab, the first platform being horizontally secured or securable to the rear sliders and selectively displaceable through movement of the rear sliders between a loading floor height of the loading floor of the aircraft loader and an aircraft loading height, the first platform operatively being driven by a cable system coupled to the rear sliders, wherein a loading zone is defined inside the loading box, with the first platform being located in the loading zone when at the loading floor height; and
  a second platform which is configured to be mounted in front of the first platform, either on top of or at a side of the cab, the second platform being horizontally secured or securable to the front sliders and displaceable through movement of the front sliders between an intermediate height and the aircraft loading height, the intermediate height being a height between the loading floor height and the aircraft loading height, wherein one or both of the first and second platform has mating formations configured such that when the first platform is raised from the loading floor height and reaches the intermediate height, the first and second platforms engage to define a loading deck which is displaceable between the intermediate height and the aircraft loading height, the second platform operatively being driven by the first platform when the platforms are engaged, thereby resulting in the first and second platforms moving in unison between the intermediate height and the aircraft loading height, and such that when the first platform is lowered from the intermediate height the first platform disengages from the second platform to permit the first platform to move back to the loading floor height; and
  a front bridge section which is connected or connectable to the second platform, at least part of the front bridge section being displaceable relative to the second platform to accommodate an aircraft opening, in use.

14. The load lifting apparatus according to claim 13, wherein each column includes a front slide receiver and a rear slide receiver, wherein each front slide receiver has a vertical slot for receiving one of the front sliders, and wherein each rear slide receiver has a vertical slot for receiving one of the rear sliders.

15. The load lifting apparatus according to claim 14, wherein the sliding portion of each of the front and rear sliders is received in the vertical slot of a corresponding one of the slide receivers, wherein an upper stopping element is located at a top of each column, the upper stopping elements being configured such that they prevent the sliding portions from being raised above the upper stopping elements and thus above the columns in use, while the platform supporting portions are configured to be raised to a height above the top of the columns, thereby permitting the aircraft loading height to be higher than a height of the columns above a ground level.

16. The load lifting apparatus according to claim 13, wherein the mating formations include one or more flanges on the second platform, wherein each flange extends from the second platform and operatively projects into a transverse plane traversed by the first platform.

17. The load lifting apparatus according to claim 13, wherein the cable system includes at least two cables, each cable being secured to a bottom region of a respective one of the rear sliders, the cable system being a cable and pulley system driven by a hydraulic piston and cylinder arrangement, wherein the hydraulic piston and cylinder arrangement is oriented along a length of the loader, the hydraulic piston and cylinder arrangement including a single stroke, single acting cylinder with a piston stroke length of greater than 1 m.

18. The load lifting apparatus according to claim 13, wherein the front bridge section has an extension which is movable in a horizontal plane relative to the loading deck.

19. The load lifting apparatus according to claim 13, wherein the columns are fitted with a stabilising arrangement which, when deployed, engages with the ground below the chassis so as to stabilise and support the aircraft loader prior to lifting of the first and second platforms.

20. The load lifting apparatus according to claim 13, wherein the aircraft loader is an aircraft catering truck for a narrow-body aircraft.

* * * * *